(12) United States Patent
Kodera et al.

(10) Patent No.: US 9,988,076 B2
(45) Date of Patent: Jun. 5, 2018

(54) STEERING CONTROL APPARATUS

(71) Applicant: JTEKT CORPORATION, Osaka-shi, Osaka (JP)

(72) Inventors: Takashi Kodera, Okazaki (JP); Naoki Yamano, Okazaki (JP); Hidenori Itamoto, Tajimi (JP); Yoshihiro Yamashita, Okazaki (JP); Koji Anraku, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/454,438

(22) Filed: Mar. 9, 2017

(65) Prior Publication Data

US 2017/0267276 A1    Sep. 21, 2017

(30) Foreign Application Priority Data

Mar. 15, 2016    (JP) .................................. 2016-051412

(51) Int. Cl.
| | |
|---|---|
| *B62D 5/04* | (2006.01) |
| *B62D 6/00* | (2006.01) |
| *B62D 6/08* | (2006.01) |
| *B62D 6/04* | (2006.01) |

(52) U.S. Cl.
CPC ......... *B62D 5/0463* (2013.01); *B62D 5/0412* (2013.01); *B62D 6/002* (2013.01); *B62D 6/008* (2013.01); *B62D 6/04* (2013.01); *B62D 6/08* (2013.01)

(58) Field of Classification Search
CPC .......... B62D 6/002; B62D 6/008; B62D 6/08
See application file for complete search history.

(56) References Cited

U.S. PATENT DOCUMENTS 6,219,604 B1    4/2001 Dilger et al.
6,474,436 B1    11/2002 Konigorski
(Continued)

FOREIGN PATENT DOCUMENTS

JP    2014-148299 A    8/2014

OTHER PUBLICATIONS

Jul. 19, 2017 Extended Search Report issued in European Patent Application No. 17160885.

*Primary Examiner* — Thomas G Black
*Assistant Examiner* — Ce Li Li
(74) *Attorney, Agent, or Firm* — Oliff PLC (57) ABSTRACT

A steering control apparatus includes a steering angle feedback processing unit and an operation signal generation processing unit that operate a reaction force actuator to adjust a steering angle to a target steering angle that is a target value for the steering angle based on feedback control, an ideal-axial-force calculation unit that calculates an ideal axial force, a road-surface-axial-force calculation unit that calculates a road surface axial force, an axial-force allocation calculation unit that calculates a base reaction force in which the ideal axial force and the road surface axial force are allocated in a predetermined ratio, and a target steering angle calculation processing unit that sets a target steering angle based on the base reaction force. The steering angle feedback processing unit feeds back the target steering angle in which road surface information is incorporated through the road surface axial force, so that the steering angle is controlled.

5 Claims, 6 Drawing Sheets

(56) References Cited

U.S. PATENT DOCUMENTS

| | | | | |
|---|---|---|---|---|
| 2009/0056474 A1* | 3/2009 | Watanabe | ............ | B62D 5/0463 |
| | | | | 73/862.193 |
| 2013/0060427 A1* | 3/2013 | Kataoka | ............... | B62D 5/0466 |
| | | | | 701/42 |
| 2014/0238770 A1* | 8/2014 | Namikawa | ........... | B62D 5/0463 |
| | | | | 180/446 |
| 2015/0251691 A1 | 9/2015 | Tamaizumi et al. | | |

* cited by examiner

STEERING CONTROL APPARATUS

INCORPORATION BY REFERENCE

The disclosure of Japanese Patent Application No. 2016-051412 filed on Mar. 15, 2016 including the specification, drawings and abstract, is incorporated herein by reference in its entirety.

BACKGROUND OF THE INVENTION

1. Field of the Invention

The invention relates to a steering control apparatus.

2. Description of the Related Art

For example, Japanese Patent Application Publication No. 2014-148299 (JP 2014-148299 A) discloses a steer-by-wire steering system in which a steering wheel is mechanically separated from steered wheels. In the steering system in JP 2014-148299 A, a reaction force is applied to the steering wheel based on a final component resulting from allocation, in a predetermined ratio, of a feedback component in which road surface information transmitted from a road surface to the steered wheels is not incorporated and a feed forward component in which the road surface information is incorporated. The final component is set as a target reaction force current that is a target value for a current supplied to a reaction force motor that applies a reaction force to the steering wheel. The reaction force applied to the steering wheel is controlled by adjusting the current supplied to the reaction force motor to the target reaction force current based on feedback control.

The control described in JP 2014-148299 A only involves feedback control in which the current flowing through the reaction force motor is adjusted to the target reaction force current. The steering angle of the steering wheel, which results from application of the reaction force to the steering wheel by the reaction force motor, is uncontrolled. In this case, even when the road surface information is incorporated in the reaction force, the steering angle of the steering wheel remains uncontrolled. Thus, fine-tuning of steering feel based on the reaction force applied to the steering wheel is difficult. Such a problem is not limited to the steer-by-wire steering system but is common even to an electric power steering system that assists a user's operation of the steering wheel so long as the steering feel is controlled by incorporating the road surface information in the user's operation of the steering wheel.

SUMMARY OF THE INVENTION

An object of the invention is to provide a steering control apparatus that allows steering feel resulting from transmission of road surface information to a steering wheel to be easily adjusted.

A steering control apparatus in an aspect of the invention outputs an operation signal to a steering system, and includes a reaction force processing unit that outputs the operation signal to the steering system to control a reaction force acting against an operation of a steering wheel performed on the steering wheel. The steering system includes a reaction force actuator that applies a reaction force and a steering operation actuator that applies a force for steering the steered wheels at least while power is not transmitted between steered wheels and the steering wheel. In the steering control apparatus, the reaction force processing unit has a steering angle control processing unit that operates the reaction force actuator so as to adjust a detection value of a steering angle to a target steering angle that is a target value for the steering angle based on feedback control, an ideal-component calculation unit that calculates an ideal component in which road surface information transmitted from a road surface to steered wheels is not incorporated, a road surface component calculation unit that calculates a road surface component in which the road surface information is incorporated, an allocated component calculation unit that calculates an allocated component in which the ideal component and the road surface component are allocated in a predetermined ratio, and a target steering angle calculation processing unit that sets a target steering angle based on the allocated component.

In this configuration, the allocated component calculation unit allows some of the road surface information to be incorporated, as the road surface component, on the reaction force that acts against the steering wheel. Thus, the ideal component and the road surface component can be allocated in the target steering angle that is a target value for the steering angle control processing unit and that is calculated based on the reaction force. The steering angle control processing unit feeds back the target steering angle in which at least the road surface component is allocated so that the steering angle can be controlled to an appropriate value. Consequently, the road surface information incorporated in the road surface component can be transmitted to the steering wheel at a micro angle level, enabling steering feel to be fine-tuned. Therefore, when the road surface information is transmitted to the steering wheel, the present configuration allows the steering feel to be easily adjusted based on the reaction force applied to the steering wheel compared to a configuration in which the steering angle is uncontrolled.

A steering control apparatus in another aspect of the invention outputs an operation signal to a steering system, and includes an assist force processing unit that outputs the operation signal to the steering system to assist an operation of a steering wheel to steer the steered wheels. The steering system includes an assist force actuator that applies an assist force that assists the operation of the steering wheel. In the steering control apparatus, the assist force processing unit includes a steered angle control processing unit that operates the assist force actuator so as to adjust a detection value of a rotation angle of a rotating shaft that is convertible into a steered angle of the steered wheels to a target steered angle that is a target value for the rotation angle based on feedback control, an ideal-component calculation unit that calculates an ideal component in which road surface information transmitted from a road surface to the steered wheels is not incorporated, a road surface component calculation unit that calculates a road surface component in which the road surface information is incorporated, an allocated component calculation unit that calculates an allocated component in which the ideal component and the road surface component are allocated in a predetermined ratio, and a target steered angle calculation processing unit that sets the target steered angle based on the allocated component.

In this configuration, the allocated component calculation unit allows some of the road surface information to be incorporated, as the road surface component, in the reaction force that acts against the steering wheel. Thus, the ideal component and the road surface component can be allocated in the target steered angle that is a target value for the steered angle control processing unit and that is calculated based on the reaction force. The steered angle control processing unit feeds back the target steered angle in which at least the road surface component is allocated as described above to allow the steered angle to be controlled to an appropriate angle. Consequently, the road surface information incorporated in the road surface component can be transmitted to the steering wheel at a micro angle level to enable steering feel to be fine-tuned. Therefore, even if the operation of the steering wheel is assisted, when the road surface information is transmitted to the steering wheel, the present configuration allows the steering feel to be easily adjusted compared to a configuration in which the steering angle is uncontrolled.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of a steering control apparatus will be described with reference to the drawings.

Figure 1:
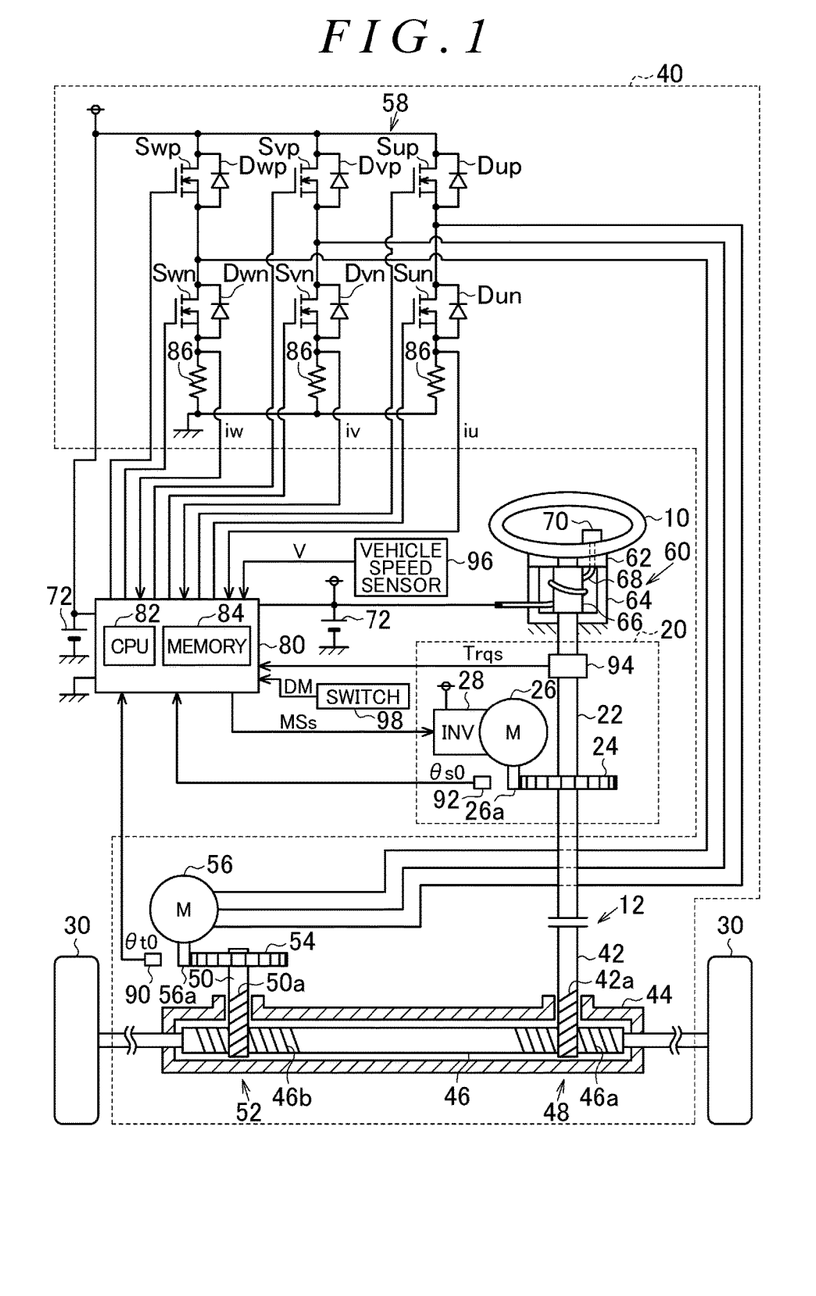
FIG. 1 is a diagram of a steering control apparatus and an operation target according to a first embodiment.

In a steering system according to the present embodiment, a steering wheel 10 is connected to a reaction force actuator 20 that applies a reaction force acting against an operation of the steering wheel 10, as depicted in FIG. 1. The reaction force actuator 20 includes a steering shaft 22 fixed to the steering wheel 10, a reaction force reduction gear 24, a reaction force motor 26 with a rotating shaft 26a coupled to the reaction force reduction gear 24, and an inverter 28 that drives the reaction force motor 26. The reaction force motor 26 is a surface permanent magnet synchronous motor (SPMSM).

The reaction force motor 26 is connected to a battery 72 via the inverter 28. The inverter 28 is a circuit that connects and disconnects between each of a positive electrode and a negative electrode of the battery 72 and each of three terminals of the reaction force motor 26.

The steering shaft 22 can be coupled to a pinion shaft 42 of a steering operation actuator 40 via a clutch 12.

The steering operation actuator 40 includes a first rack-and-pinion mechanism 48, a second rack-and-pinion mechanism 52, an SPMSM (steering operation motor 56), and an inverter 58.

The first rack-and-pinion mechanism 48 includes a rack shaft 46 and the pinion shaft 42 arranged at a predetermined crossing angle. First rack teeth 46a formed on the rack shaft 46 are meshed with pinion teeth 42a formed on the pinion shaft 42. Steered wheels 30 are coupled to opposite ends of the rack shaft 46 via respective tie rods.

The second rack-and-pinion mechanism 52 includes the rack shaft 46 and a pinion shaft 50 arranged at a predetermined crossing angle. Second rack teeth 46b formed on the rack shaft 46 are meshed with pinion teeth 50a formed on the pinion shaft 50.

The pinion shaft 50 is connected to a rotating shaft 56a of the steering operation motor 56 via the steering operation reduction gear 54. The inverter 58 is connected to the steering operation motor 56. The rack shaft 46 is housed in a rack housing 44.

In FIG. 1, reference characters for MOS field effect transistors (switching elements) included in the inverter 58 and connected to three terminals of the steering operation motor 56 include u, v, and w. Reference characters for MOS field effect transistors included in the inverter 58 and arranged on an upper arm and on a lower arm include p and n, respectively. In the following description, u, v, and w are collectively designated as ¥, and p and n are collectively designated as #. That is, the inverter 58 includes a serial connection member including switching elements S¥p that connect and disconnect between the positive electrode of the battery 72 and each terminal of the steering operation motor 56 and switching elements S¥n that connect and disconnect between the negative electrode of the battery 72 and each terminal of the steering operation motor 56 such that the switching elements S¥p are connected in series with the switching elements S¥n. Diodes D¥# are connected in inverse parallel with the switching elements S¥#.

A spiral cable apparatus 60 is coupled to the steering wheel 10. The spiral cable apparatus 60 includes a first housing 62 fixed to the steering wheel 10, a second housing 64 fixed to a vehicle body, a tubular member 66 housed in a space defined by the first housing 62 and the second housing 64 and fixed to the second housing 64, and a spiral cable 68 wound around the tubular member 66. The steering shaft 22 is inserted into the tubular member 66. The spiral cable 68 is an electric wire connecting a horn 70 fixed to the steering wheel 10 to, for example, a battery 72 fixed to the vehicle body.

The steering control apparatus (control apparatus 80) performs control to steer the steered wheels 30 in accordance with an operation of the steering wheel 10 by operating the steering system including the reaction force actuator 20 and the steering operation actuator 40. In the present embodiment, the reaction force actuator 20 and the steering operation actuator 40 implement a steer-by-wire system. The control apparatus 80 normally performs control to steer the steered wheels 30 in accordance with an operation of the steering wheel 10 while keeping the clutch 12 disengaged.

In this case, the control apparatus 80 loads a rotation angle θs0 of the rotating shaft 26a of the reaction force motor 26 detected by a steering sensor 92 and a steering torque Trqs applied to the steering shaft 22 and detected by a torque sensor 94. The control apparatus 80 also loads a rotation angle θt0 of the rotating shaft 56a of the steering operation motor 56 detected by a steering operation sensor 90 and a vehicle speed V detected by a vehicle speed sensor 96. The control apparatus 80 acquires voltage drops at shunt resistors 86 connected to sources of the switching elements S¥n as currents iu, iv, iw to reference the currents iu, iv, iw. The control apparatus 80 also loads a drive mode DM indicative of a setting state of a control pattern for an in-vehicle engine and the like. Fuel efficiency and responsiveness (direct feeling) of driving of the vehicle to the user's request vary depending on the drive mode DM. For example, the drive mode DM includes an ECO mode that makes an output from an engine or the like appropriate so as to improve fuel efficiency, a normal mode that makes the output from the engine or the like appropriate so as to improve the responsiveness to the user's request compared to the ECO mode, and a sports mode that makes the output from the engine or the like appropriate so as to improve the responsiveness to the user's request regardless of fuel efficiency. The drive mode DM is switched by a switch 98 that can be operated by the user.

Specifically, the control apparatus 80 includes a central processing unit (CPU) 82 and a memory 84 such that the CPU 82 executes a program stored in the memory 84 to operate the reaction force actuator 20 and the steering operation actuator 40.

Figure 2:
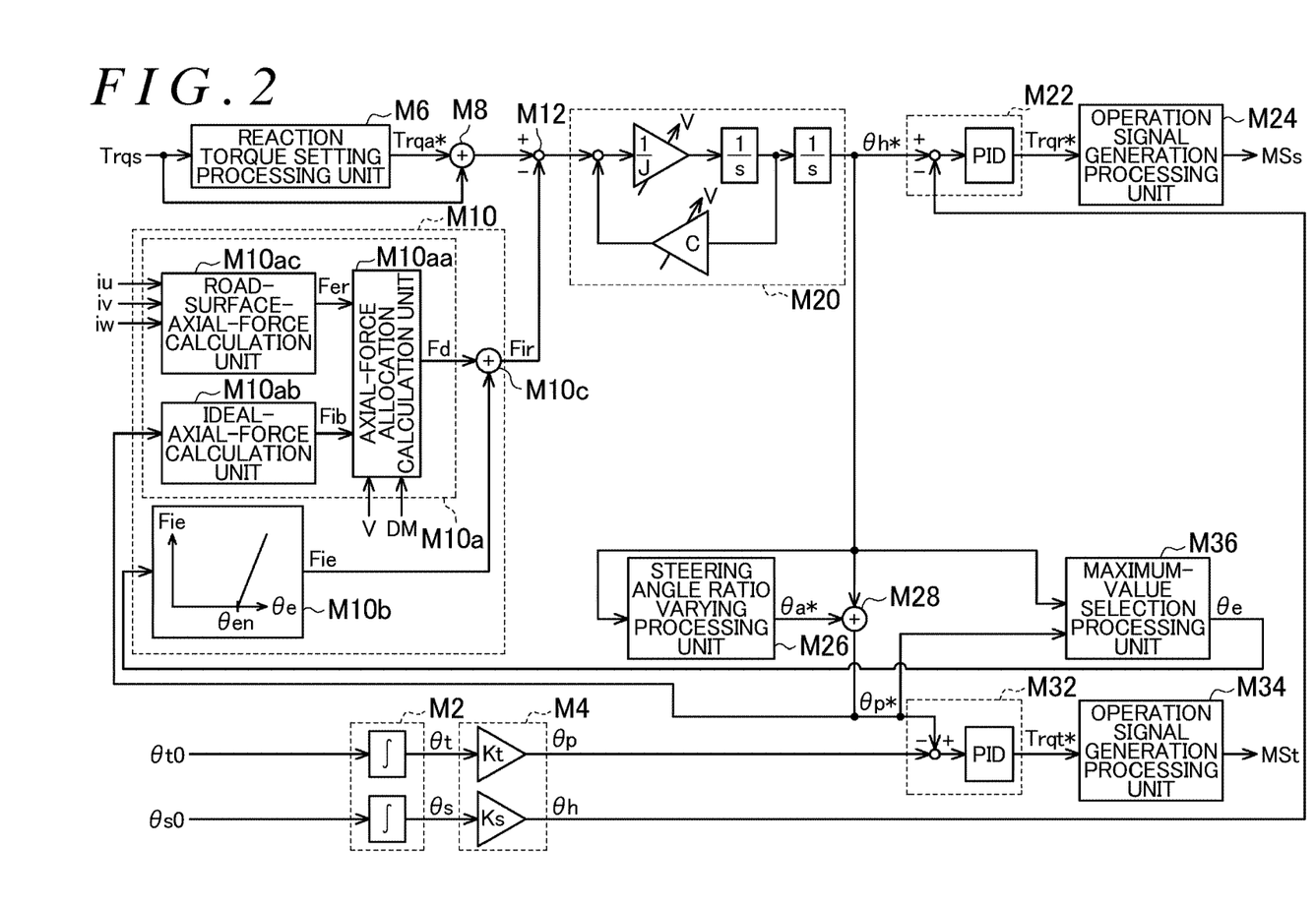
FIG. 2 is a block diagram of the first embodiment.

FIG. 2 illustrates a portion of processing executed by the control apparatus 80. The processing illustrated in FIG. 2 represents a portion of the processing implemented by the CPU 82 executing the program stored in the memory 84, for each type of processing implemented.

An integration processing unit M2 converts the rotation angle θs0 detected by the steering sensor 92 and the rotation angle θt0 detected by the steering operation sensor 90 into numerical values for an angle region wider than an angle region from 0° to 360°. Thus, rotation angles θs, θt are obtained. For example, when the steering wheel 10 is maximally turned clockwise or counterclockwise from a neutral position where the vehicle is driven straight ahead, the rotating shaft 26a makes a plurality of rotations. Therefore, for example, when the rotating shaft 26a makes two rotations in a predetermined direction from the state in which the steering wheel 10 is in the neutral position, the integration processing unit M2 provides an output value of 720°. The integration processing unit M2 provides an output value of zero at the neutral position.

A measurement unit setting processing unit M4 calculates a steering angle θh by multiplying, by a conversion factor Ks, an output value from the steering sensor 92 resulting from the processing by the integration processing unit M2, and calculates a steered angle θp by multiplying, by a conversion factor Kt, an output value from the steering operation sensor 90 resulting from the processing by the integration processing unit M2. The conversion factor Ks is preset in accordance with a rotation speed ratio between the reaction force reduction gear 24 and the rotating shaft 26a of the reaction force motor 26. The conversion factor Ks allows the amount of variation in the rotation angle θs of the rotating shaft 26a to be converted into the amount of rotation of the steering wheel 10. Thus, the steering angle θh is the rotation angle of the steering wheel 10 with reference to the neutral position. The conversion factor Kt is the product of a rotation speed ratio between the steering operation reduction gear 54 and the rotating shaft 56a of the steering operation motor 56 and a rotation speed ratio between the pinion shaft 50 and the pinion shaft 42. The conversion factor Kt allows the amount of rotation of the rotating shaft 56a to be converted into the amount of rotation of the steering wheel 10 obtained if the clutch 12 is engaged.

The processing in FIG. 2 involves positive values when the rotation angles θs, θt, the steering angle θh, and the steered angle θp are rotation angles in a predetermined direction, and involves negative values when the rotation angles θs, θt, the steering angle θh, and the steered angle θp are rotation angles in the opposite direction. For example, when the rotating shaft 26a rotates in the direction opposite to the predetermined direction from the state in which the steering wheel 10 is in the neutral position, the integration processing unit M2 provides a negative output value. However, this is only an example of logic for the control system. In particular, for each of the rotation angles θs, θt, the steering angle θh, and the steered angle θp, a large angle as used herein refers to a large amount of variation from the neutral position. In other words, a large angle refers to a large absolute value of a parameter which may be either a positive value or a negative value.

A reaction torque setting processing unit M6 sets a reaction torque Trqa* based on the steering torque Trqs. A value to which the reaction torque Trqa* is set increases as the steering torque Trqs increases. An addition processing unit M8 adds the steering torque Trqs to the reaction torque Trqa* to output the sum.

A reaction force setting processing unit M10 sets a reaction force Fir that acts against rotation of the steering wheel 10. Specifically, the reaction force setting processing unit M10 uses a base reaction force setting processing unit 10a to set a base reaction force Fd corresponding to an operation of the steering wheel 10, while using a limiting reaction force setting processing unit M10b to set a limiting reaction force Fie that acts against operative rotation of the steering wheel 10 toward an upper limit side when the amount of rotation of the steering wheel 10 approaches an allowable maximum value. The reaction force setting processing unit M10 uses an addition processing unit M10c to add the base reaction force Fd and the limiting reaction force Fie together to output the sum as the reaction force Fir.

A deviation calculation processing unit M12 subtracts the reaction force Fir from the output from the addition processing unit M8 to output the difference.

A target steering angle calculation processing unit M20 sets a target steering angle θh* based on the output value from the deviation calculation processing unit M12. Here, a model formula is utilized which is expressed by Equation (c1) that relates the output value Δ from the deviation calculation processing unit M12 to the target steering angle θh*.

$$\Delta = C \cdot \theta h^{*\prime} + J \cdot \theta h^{*\prime\prime} \tag{c1}$$

The model expressed by Equation (c1) defines a relationship between the torque on and the rotation angle of a rotating shaft that rotates in conjunction with rotation of the steering wheel 10 in a configuration in which the steering wheel 10 is mechanically coupled to the steered wheels 30. In Equation (c1), a viscosity coefficient C is, for example, a modeled friction in the steering system, and a factor of inertia J is a modeled inertia in the steering system. The viscosity coefficient C and the factor of inertia J are variably set according to the vehicle speed V.

A steering angle feedback processing unit M22 sets a target reaction torque Trqr* that is a target value for the reaction force generated by the reaction force motor 26 as a manipulated variable used to adjust the steering angle θh to the target steering angle θh* based on feedback control. Specifically, the target reaction torque Trqr* is the sum of output values from a proportional element, an integral element, and a differential element to which a value resulting from subtraction of the steering angle θh from the target steering angle θh* is input.

An operation signal generation processing unit M24 generates an operation signal MSs for the inverter 28 based on the target reaction torque Trqr* and outputs it to the inverter 28. This can be implemented, for example, based on well-known current feedback control in which a command value for a q-axis current is set based on the target reaction torque Trqr* and in which voltage command values for a d axis and a q axis are set as manipulated variables used to adjust currents on the d axis and the q axis to the command values. The d-axis current may be controlled to zero. However, if the reaction force motor 26 rotates at a high speed, the absolute value of the d-axis current may be set to a value larger than zero to allow field weakening control to be performed. Of course, the absolute value of the d-axis current may be set to a value larger than zero for a low-rotation-speed region. The following constitutes an example of a reaction force processing unit: the reaction torque setting processing unit M6, the addition processing unit M8, the reaction force setting processing unit M10, the deviation calculation processing unit M12, the target steering angle calculation processing unit M20, the steering angle feedback processing unit M22, and the operation signal generation processing unit M24. In particular, the steering angle feedback processing unit M22 and the operation signal generation processing unit M24 constitute an example of a steering angle control processing unit.

A steering angle ratio varying processing unit M26 sets a target operating angle θa* used to variably set a steering angle ratio that is a ratio between the steering angle θh and the steered angle θp based on the target steering angle θh*. An addition processing unit M28 calculates the target steered angle θp* by adding the target operating angle θa* to the target steering angle θh*.

A steered angle feedback processing unit M32 sets a target steered torque Trqt* generated by the steering operation motor 56, as a manipulated variable used to adjust the steered angle θp to the target steering angle θp* based on feedback control. Specifically, the target steered torque Trqt* is the sum of output values from a proportional element, an integral element, and a differential element to which a value resulting from subtraction of the steered angle θp from the target steered angle θp* is input.

An operation signal generation processing unit M34 generates an operation signal MSt for the inverter 58 based on the target steered torque Trqt* and outputs it to the inverter 58. This is executed similarly to the generation processing for the operation signal executed by the operation signal generation processing unit M24. The steered angle feedback processing unit M32 and the operation signal generation processing unit M34 constitute an example of a steered angle control processing unit.

A maximum-value selection processing unit M36 selects and outputs a larger value (maximum value θe) that is either the target steering angle θh* or the target steered angle θp*.

The base reaction force setting processing unit M10a receives the target steered angle θp* as an input. On the other hand, the limiting reaction force setting processing unit M10b sets the limiting reaction force Fie using the maximum value θe as an input. This setting enables a control to increase the force of the steering wheel 10 acting against a further increase in the steering angle both immediately before an end of the rack shaft 46 displaced in the axial direction comes into contact with a rack housing 44 (rack stopper) and immediately before the steering wheel 10 rotates to an upper limit value determined based on the spiral cable 68. This will be described below.

Figure 3:
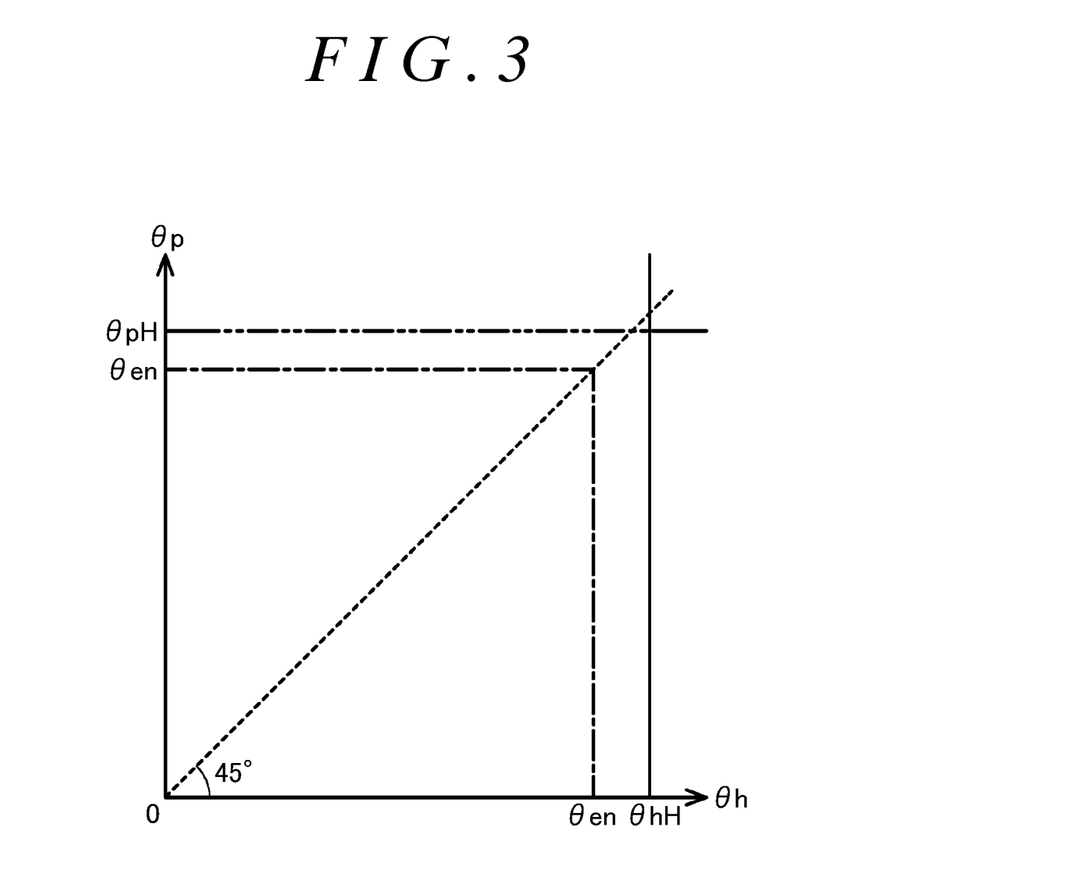
FIG. 3 is a diagram illustrating a threshold for a steering angle and a steered angle according to the first embodiment.

FIG. 3 illustrates a relationship between upper limit values θhH, θpH of the steering angle θh and the steered angle θp. In the present embodiment, the upper limit value θhH of the steering angle θh is approximately equal to the upper limit value θpH of the steered angle θp as depicted in FIG. 3. This is achieved by the measurement unit setting processing unit M4 setting measurement units for the steering angle θh and the steered angle θp. In the present embodiment, the spiral cable 68 is provided with a slight margin in length so that, with the clutch 12 engaged, the steering wheel 10 can further be slightly rotated before the rack shaft 46 displaced in the axial direction comes into contact with the rack housing 44. Thus, the measurement unit setting processing unit M4 sets the steering angle θh equal to the rotation angle of the steering wheel 10 and sets the steered angle θp equal to the rotation angle of the steering wheel 10 obtained when the target operating angle θa* is assumed to be zero so that the upper limit value θhH of the steering angle θh is approximately equal to the upper limit value θpH of the steered angle θp.

In the present embodiment, a common threshold θen common to the steering angle θh and the steered angle θp is set so that the reaction force of the steering wheel 10 is controlled to increase before both the steering angle θh and the steered angle θp reach the respective upper limit values θhH and θpH. The limiting reaction force setting processing unit M10b illustrated in FIG. 2 includes a map specifying a relationship between the maximum value θe and the limiting reaction force Fie. The map indicates that, when equal to or larger than the common threshold θen, the maximum value θe is larger than zero and in particular that the maximum value θe is set to be large enough to preclude a further operation of the steering wheel by the human force when larger than the common threshold θen by a certain value. FIG. 2 only illustrates that the limiting reaction force Fie increases as the maximum value θe increases in a predetermined rotating direction from zero. However, the absolute value of the limiting reaction force Fie increases even when the maximum value θe increases in a direction opposite to the predetermined rotating direction. However, the limiting reaction force Fie in the processing in FIG. 2 has a negative value in the case of a rotating direction opposite to the predetermined rotating direction.

In the present embodiment, the reaction force setting processing unit M10 includes an axial-force allocation calculation unit M10aa that executes a calculation allowing a base reaction force Fd to be set as an allocated component in which an ideal axial force Fib and a road surface axial force Fer are allocated in a predetermined ratio so as to incorporate an axial force applied to the steered wheels 30 from the road surface, as illustrated in FIG. 2. The axial force applied to the steered wheels 30 is road surface information transmitted from the road surface to the steered wheels 30.

The reaction force setting processing unit M10 further includes an ideal-axial-force calculation unit M10ab that calculates, as a component of the base reaction force Fd, the ideal axial force Fib that is an ideal value for the axial force acting on the steered wheels 30 (the force transmitted to the steered wheels 30) and that is also an ideal component in which the road surface information is not incorporated. The ideal-axial-force calculation unit M10ab calculates the ideal axial force Fib based on the target steered angle θp*. For example, the absolute value of the ideal axial force Fib is set to increase as the absolute value of the target steered angle θp* increases. The axial-force allocation calculation unit M10aa is an example of an allocated component calculation unit. The ideal-axial-force calculation unit M10ab is an example of an ideal-component calculation unit.

The reaction force setting processing unit M10 further includes a road-surface-axial-force calculation unit M10ac that calculates, as a component of the base reaction force Fd, a road surface axial force Fer that is an estimated value of axial force acting on the steered wheels 30 (the force transmitted to the steered wheels 30) and that is also a road surface component in which the road surface information is incorporated. The road-surface-axial-force calculation unit M10ac acquires the currents iu, iv, iw that are actual current values of the steering operation motor 56 to calculate the q-axis current iq from the currents iu, iv, iw and then calculates the road surface axial force Fer based on the q-axis current iq. Calculation of the q-axis current iq can be achieved by conversion into a coordinate system with the d and q axes that is a rotary coordinate system, based on the rotation angle θt0 of the steering operation motor 56. The road-surface-axial-force calculation unit M10*ac* calculates the road surface axial force Fer by multiplying the q-axis current iq by a predetermined coefficient K1. The predetermined coefficient K1 is set based on a gear ratio of the steering operation reduction gear 54, a ratio between the torque on the pinion shaft 42 and the axial force on the rack shaft 46, and a torque constant. That is, the torque of the steering operation motor 56 is determined by multiplying the q-axis current iq by a constant. The torque of the steering operation motor 56 is converted by the steering operation reduction gear 54 and the like so that the resultant torque is applied to the rack shaft 46. Thus, multiplication of the q-axis current iq by the predetermined coefficient K1 allows calculation of an axial force applied to the rack shaft 46 by the steering operation motor 56. When a balanced relationship may be considered to be present between the axial force applied to the rack shaft 46 by the steering operation motor 56 and an axial force applied to the steered wheels 30 from the road surface, the axial force applied to the steered wheels 30 from the road surface can be estimated as the road surface axial force Fer. The road surface axial force Fer is a component in which at least the road surface information is incorporated. The road-surface-axial-force calculation unit M10*ac* is an example of a road surface component calculation unit.

Figure 4:
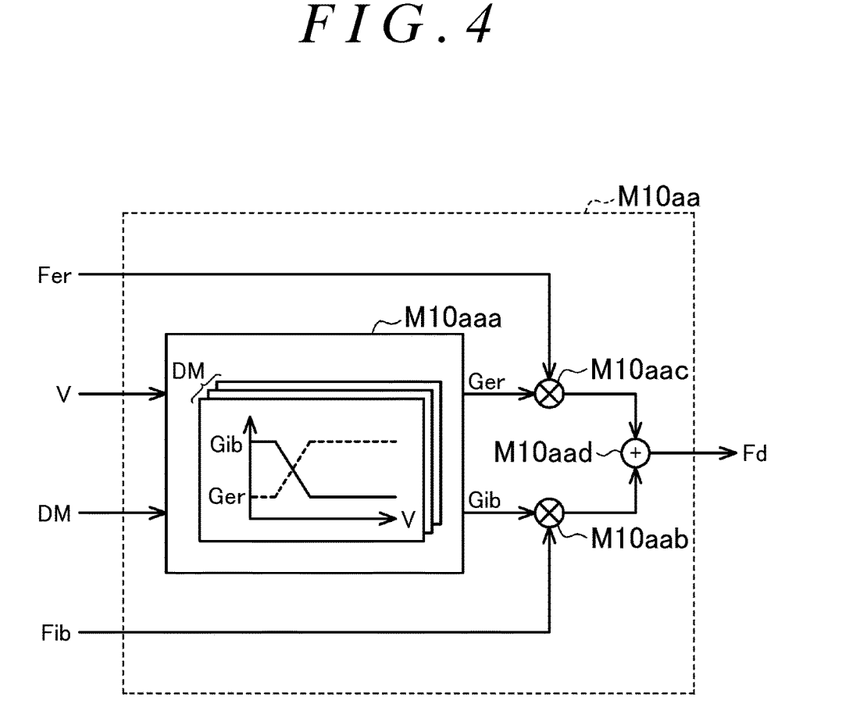
FIG. 4 is a block diagram illustrating an axial-force allocation calculation unit according to the first embodiment.

As depicted in FIG. 4, the axial-force allocation calculation unit M10*aa* includes a gain calculation unit M10*aaa* that calculates an allocation gain Gib and an allocation gain Ger that are the allocation rates of the ideal axial force Fib and the road surface axial force Fer for allocation. The gain calculation unit M10*aaa* includes a three-dimensional map specifying relationship between the vehicle speed V and the allocation gains Gib, Ger and the drive mode DM selected by the user. The gain calculation unit M10*aaa* receives the drive mode DM and the vehicle speed V as inputs to calculate the allocation gains Gib, Ger based on the map. The allocation gain Gib has a smaller value when the vehicle speed V is high than when the vehicle speed V is low. On the other hand, the allocation gain Ger has a larger value when the vehicle speed V is high than when the vehicle speed V is low. The values of the allocation gains Gib, Ger are set such that, for example, the total of the allocation gains Gib, Ger is 1 when the drive mode DM is the above-described ECO mode or normal mode. On the other hand, for example, when the drive mode DM is the above-described sports mode, the allocation gains Gib, Ger are set to increase the value of the allocation gain Ger so that the total value of the allocation gains Gib, Ger is larger than 1, and particularly to increase the allocation gain Ger as the vehicle speed V increases.

The axial-force allocation calculation unit M10*aa* uses a multiplication processing unit M10*aab* to multiply the output value from the ideal-axial-force calculation unit M10*ab* by the allocation gain Gib. The axial-force allocation calculation unit M10*aa* also uses a multiplication processing unit M10*aac* to multiply the output value from the road-surface-axial-force calculation unit M10*ac* by the allocation gain Ger. The axial-force allocation calculation unit M10*aa* further uses an addition processing unit M10*aad* to calculate the base reaction force Fd by adding the ideal axial force Fib multiplied by the allocation gain Gib to the road surface axial force Fer multiplied by the allocation gain Ger. The axial-force allocation calculation unit M10*aa* then outputs the base reaction force Fd.

The above-described present embodiment produces the following effects.

(1) The axial-force allocation calculation unit M10*aa* can incorporate some of the road surface information needed according to the current drive mode DM and vehicle speed V, in the reaction force Fir acting against the rotation of the steering wheel 10, as the road surface axial force Fer. Thus, the ideal axial force Fib and the road surface axial force Fer can be allocated in the target steering angle θh* that is a target value for the steering angle feedback processing unit M22 and that is calculated based on the reaction force Fir. The steering angle feedback processing unit M22 feeds back the target steering angle θh* in which at least the road surface axial force Fer is allocated as described above, so that the steering angle θh can be controlled to the appropriate angle. Consequently, the road surface information incorporated in the road surface axial force Fer can be transmitted to the steering wheel 10 at a micro angle level of the steering angle θh to enable the steering feel to be fine-tuned. Therefore, compared to a configuration in which the steering angle θh is uncontrolled, the present configuration allows the steering feel to be easily adjusted based on the reaction force applied to the steering wheel 10 when the road surface information is transmitted to the steering wheel 10.

In the present embodiment, the ideal axial force Fib and the road surface axial force Fer are allocated in the target steered angle θp* that is the target value for the steered angle feedback processing unit M32 and that is calculated based on the reaction force Fir. The steered angle feedback processing unit M32 feeds back the target steered angle θp* in which at least the road surface axial force Fer is allocated as described above, so that the steered angle θp can be controlled to the appropriate angle. Consequently, the road surface information incorporated in the road surface axial force Fer can be transmitted to the steered wheels 30 at a micro angle level of the steered angle θp to enable fine-tuning of, for example, displacement of the vehicle with respect to a traveling direction thereof.

(2) The road surface axial force Fer is calculated using the current iq based on the actual current values of the steering operation motor 56. Thus, the road surface axial force Fer can be calculated without difficulty even for a steer-by-wire system in which the clutch 12 is kept disengaged.

The axial force applied to the steered wheels 30 may be significantly lower during traveling on a low μ road, for example, traveling on a frozen road surface, than during traveling on a road surface of a non-low-μ road. In this case, in a configuration in which the steering wheel 10 and the steered wheels 30 are mechanically coupled together, the reaction force of the steering wheel 10 significantly decreases. In the present embodiment, such a change in reaction force can be transmitted to the steering wheel 10 through the road surface axial force Fer as a change in reaction force even while the clutch 12 is disengaged. That is, when traveling on a road surface of a non-low-μ road is shifted to traveling on a low μ road as in the above-described example, the reaction force actuator 20 (reaction force motor 26) enables a rapid decrease in the reaction force of the steering wheel 10 to be realized.

(3) While the vehicle is traveling, acquisition of the road surface information by the user may be advantageous depending on a traveling state of the vehicle. For example, in the above-described sports mode, when the responsiveness of traveling of the vehicle to the user's request is improved, the user needs to acquire more road surface information. This need increases as a vehicle speed V increases. Even in the above-described ECO mode or normal mode, the need to acquire the road surface information increases as the vehicle speed V increases.

In this regard, the present embodiment varies the allocation gains Gib, Ger, that is, the allocation ratio between the ideal axial force Fib and the road surface axial force Fer, based on the drive mode DM and the vehicle speed V to enable a variation in the amount of road surface information transmitted to the steering wheel 10. Consequently, the amount of road surface information transmitted to the steering wheel 10 can be adjusted to allow the user to acquire a needed amount of road surface information according to a traveling state of the vehicle. This allows the steering feel to be effectively improved.

On the other hand, the need to reduce the amount of road surface information transmitted to the steering wheel 10 may increase. This applies to a case where the vehicle is traveling down a gravel road with the steered wheels 30 subjected to irregular vibration from the gravel road. Even in this case, the amount of road surface information transmitted to the steering wheel 10 can be varied so as to increase the allocation rate of the ideal axial force Fib, for example, by increasing the allocation gain Gib. Consequently, steering feel based on a small amount of road surface information transmitted to the steering wheel 10 can be realized, enabling reduction or avoidance of the adverse effect of irregular vibration from the gravel road on the steering feel.

(4) For example, in the above-described sports mode, the allocation gain Ger has a large value so as to make the total of the allocation gains Gib, Ger larger than 1. This enables diverse manners of transmitting the road surface information to be acquired by the user. Consequently, the degree of freedom of adjustment of the steering feel can be increased to allow contribution to diversifying the steering feel.

A second embodiment will be described with reference to the drawings with focus placed on differences from the first embodiment.

Figure 5:
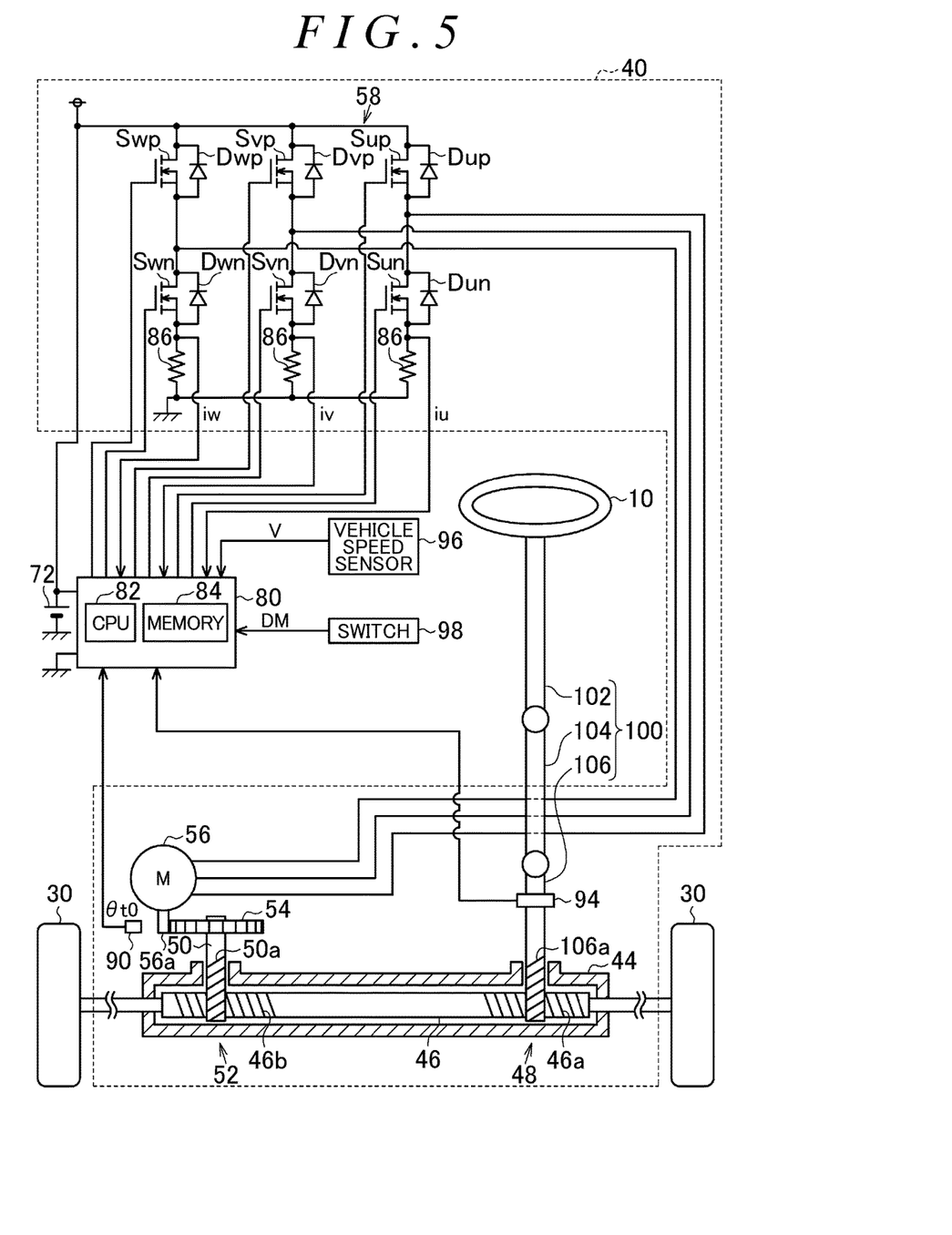
FIG. 5 is a diagram of a steering control apparatus and an operation target according to a second embodiment.

FIG. 5 depicts a system according to the present embodiment. Members in FIG. 5 that correspond to members depicted in FIG. 1 are denoted by the same reference numerals for convenience.

The steering system according to the present embodiment does not include the clutch 12 or the reaction force actuator 20. The steering wheel 10 is fixed to a steering shaft 100, and the rack shaft 46 reciprocates in the axial direction in conjunction with rotation of the steering shaft 100. The steering shaft 100 is configured by coupling a column shaft 102, an intermediate shaft 104, and a pinion shaft 106 together in this order from the steering wheel 10 side.

The rack shaft 46 and the pinion shaft 106 are arranged at a predetermined crossing angle. A first rack-and-pinion mechanism 48 is configured by meshing first rack teeth 46a formed on the rack shaft 46 with pinion teeth 106a formed on the pinion shaft 106. Rotation of the steering shaft 100 associated with an operation of the steering wheel 10 is converted by the first rack-and-pinion mechanism 48 into axial displacement of the rack shaft 46, which varies the steered angle of the steered wheels 30, that is, varies the traveling direction of the vehicle.

The control apparatus 80 performs control to steer the steered wheels 30 corresponding to an operation of the steering wheel 10, by operating a steering system including the steering operation actuator 40 that applies an assist force that is a force assisting the operation of the steering wheel 10. In the present embodiment, the steering operation actuator 40 implements a rack assist electric power steering system. The control apparatus 80 operates the inverter 58 connected to the steering operation motor 56 to control the amount of control (torque) of the steering operation motor 56. The torque sensor 94 detects the steering torque Trqs applied to the pinion shaft 106, included in the steering shaft 100. The steering operation actuator 40 is an example of an assist force actuator.

Figure 6:
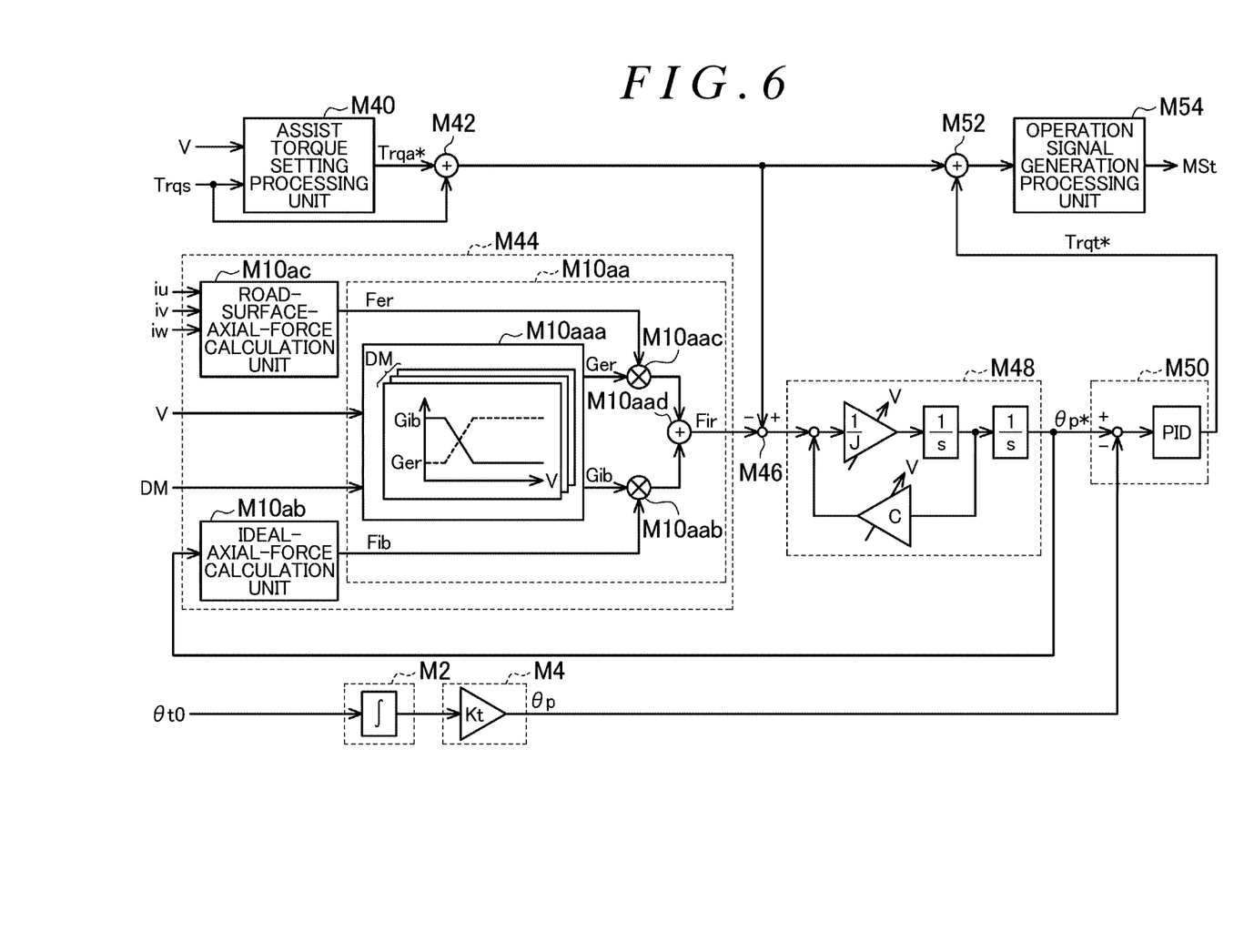
FIG. 6 is a block diagram according to the second embodiment.

FIG. 6 illustrates a portion of processing executed by the control apparatus 80. The processing illustrated in FIG. 6 is a portion of the processing implemented by the CPU 82 executing the program stored in the memory 84, for each type of processing implemented. Portions of the processing in FIG. 6 that correspond to portions of the processing illustrated in FIG. 2 are denoted by the same reference numerals for convenience.

The integration processing unit M2 converts the rotation angle θt0 detected by the steering operation sensor 90 into a numerical value for an angle region wider than an angle region from 0° to 360°. Thus, the rotation angle θt is obtained. The measurement unit setting processing unit M4 calculates the steered angle θp by multiplying, by the conversion factor Kt, the output value from the steering operation sensor 90 resulting from the processing by the integration processing unit M2. The conversion factor Kt is the product of the rotation speed ratio between the steering operation reduction gear 54 and the rotating shaft 56a of the steering operation motor 56 and the rotation speed ratio between the pinion shaft 50 and the pinion shaft 106.

An assist torque setting processing unit M40 sets an assist torque Trqa* based on the vehicle speed V and the steering torque Trqs. The assist torque Trqa* is set to a value that increases as the steering torque Trqs increases. The assist torque Trqa* is set to have a variation gradient (assist gradient) that decreases as the vehicle speed V increases. An addition processing unit M42 adds the steering torque Trqs to the assist torque Trqa* to output the resultant torque.

A reaction force setting processing unit M44 sets the reaction force Fir that acts against rotation of the steering wheel 10.

A deviation calculation processing unit M46 subtracts the reaction force Fir from the output from the addition processing unit M42 to output a resultant value.

A target steered angle calculation processing unit M48 sets the target steered angle θp* based on the output value from the deviation calculation processing unit M46. Here, a model formula is utilized which is expressed by Equation (c2) that relates the output value Δ from the deviation calculation processing unit M46 to the target steered angle θp*.

$$\Delta = C \cdot \theta p^{*\prime} + J \cdot \theta p^{*\prime\prime} \qquad (c2)$$

The model expressed by Equation (c2) defines a relationship between the torque on and the rotation angle of a rotating shaft that rotates in conjunction with rotation of the steering wheel 10. The viscosity coefficient C and the factor of inertia J in Equation (c2) are the same as the viscosity coefficient C and the factor of inertia J in Equation (c1).

A steered angle feedback processing unit M50 sets a target steered torque Trqt* generated by the steering operation motor 56, as a manipulated variable used to adjust the steered angle θp to the target steering angle θp* based on feedback control. Specifically, the target steered torque Trqt* is the sum of output values from a proportional element, an integral element, and a differential element to which a value resulting from subtraction of the steered angle θp from the target steered angle θp* is input. An addition processing unit M52 adds the target steered torque Trqt* to the output value from the addition processing unit M42 to output the sum.

An operation signal generation processing unit M54 generates the operation signal MSt for the inverter 58 based on the output value from the addition processing unit M52 to output the operation signal MSt to the inverter 58. This can be achieved, for example, based on well-known current feedback control in which the command value for the q-axis current is set based on a value resulting from addition of the assist torque Trqa*, the steering torque Trqs, and the target steered torque Trqt* and in which the voltage command values for the d axis and the q axis are set as manipulated variables used to adjust the currents on the d axis and the q axis to the command values. The following constitute an example of an assist force processing unit: the assist torque setting processing unit M40, the addition processing unit M42, the reaction force setting processing unit M44, the deviation calculation processing unit M46, the target steered angle calculation processing unit M48, the steered angle feedback processing unit M50, the addition processing unit M52, and the operation signal generation processing unit M54. In particular, the steered angle feedback processing unit M50, the addition processing unit M52, and the operation signal generation processing unit M54 constitute an example of a steered angle control processing unit.

In the present embodiment, the reaction force setting processing unit M44 includes the axial-force allocation calculation unit M10aa that executes a calculation allowing setting of the reaction force Fir so as to incorporate the axial force (road surface information) applied to the steered wheels 30 from the road surface, as illustrated in FIG. 6. That is, the reaction force setting processing unit M44 includes the ideal-axial-force calculation unit M10ab that calculates the ideal axial force Fib, which is a component of the reaction force Fir. The ideal-axial-force calculation unit M10ab calculates the ideal axial force Fib based on the target steered angle θp*. The reaction force setting processing unit M44 includes the road-surface-axial-force calculation unit M10ac that calculates the road surface axial force Fer, which is a component of the reaction force Fir.

The axial-force allocation calculation unit M10aa uses the multiplication processing unit M10aab to multiply the output value from the ideal-axial-force calculation unit M10ab by the allocation gain Gib. The axial-force allocation calculation unit M10aa also uses the multiplication processing unit M10aac to multiply the output value from the road-surface-axial-force calculation unit M10ac by the allocation gain Ger. The axial-force allocation calculation unit M10aa further uses the addition processing unit M10aad to calculate the reaction force Fir by adding the ideal axial force Fib multiplied by the allocation gain Gib to the road surface axial force Fer multiplied by the allocation gain Ger. The axial-force allocation calculation unit M10aa then outputs the reaction force Fir.

In addition to the effects (3) and (4) of the first embodiment, the present embodiment can produce the following effects.

(5) The ideal axial force Fib and the road surface axial force Fer can be allocated in the target steered angle θp* that is a target value for the steered angle feedback processing unit M50 and that is calculated based on the reaction force Fir. The steered angle feedback processing unit M50 feeds back the target steered angle θp* in which at least the road surface axial force Fer is allocated as described above, so that the steered angle θp can be controlled to the appropriate angle. Consequently, the road surface information incorporated in the road surface axial force Fer can be transmitted to the steering wheel 10 at a micro angle level to enable the steering feel to be fine-tuned. Therefore, even when the operation of the steering wheel 10 is assisted, compared to a configuration in which the steered angle θp is uncontrolled, the present configuration allows the steering feel to be easily adjusted when the road surface information is transmitted to the steering wheel 10.

(6) The road surface axial force Fer is calculated using the current iq based on the actual current values of the steering operation motor 56. Thus, even when the operation of the steering wheel 10 is assisted, the road surface axial force Fer can be calculated without difficulty even with the effect of the assist force taken into account.

The axial force applied to the steered wheels 30 may be significantly lower during traveling on a low μ road, for example, traveling on a frozen road surface, than during traveling on a road surface of a non-low-μ road, leading to a significantly reduced reaction force of the steering wheel 10. In the present embodiment, such a change in reaction force can be transmitted to the steering wheel 10 through the road surface axial force Fer as a change in reaction force when the operation of the steering wheel 10 is assisted. That is, when traveling on a road surface of a non-low-μ road is shifted to traveling on a low μ road as in the above-described example, the steering operation actuator 40 (steering operation motor 56) enables a rapid decrease in the reaction force of the steering wheel 10 to be realized.

The embodiments may be implemented in the following forms.

The values of the allocation gains Gib, Ger may be set such that the total of the allocation gains Gib, Ger is 1 regardless of the drive mode DM. In this case, the gain calculation unit M10aaa may calculate one of the allocation gains Gib, Ger based on the map and calculate the remaining allocation gain by subtracting the resultant allocation gain from 1. The values of the allocation gains Gib, Ger may be set such that the total of the allocation gains Gib, Ger is less than 1. Various types of steering feel can be realized by varying the manner of setting the allocation gains Gib, Ger as described above.

For parameters used to calculate the allocation gains Gib, Ger, instead of the drive mode DM and the vehicle speed V, the following parameters may be used: the steering angle θh, the steered angle θp, a rotational angular velocity (what is called a yaw rate) around a vertical axis passing through a center of gravity of the vehicle, and a difference in wheel speed between wheel speed sensors provided for the right and left steered wheels 30. The parameters including the drive mode DM and the vehicle speed V may each be independently used or may be optionally combined together. The allocation gains Gib, Ger may be calculated based on information obtained from a GPS or the like. As described above, parameters to be focused on may be optionally selected to adjust the steering feel, enabling an increase in the degree of freedom of adjustment of the steering feel.

For each of the allocation gains Gib, Ger, the relation with the vehicle speed V can be varied. For example, the allocation gain Gib may have a value decreasing as the vehicle speed V increases. The allocation gain Ger may have a value increasing as the vehicle speed V increases. That is, for each of the allocation gains Gib, Ger, the relation with the vehicle speed V may be set in accordance with specifications for the vehicle, a usage environment thereof, or the like.

The types of the drive mode DM may be increased or reduced in accordance with the specifications for the vehicle. In this case, the map may be provided in accordance with the types of the drive mode DM. Instead of being selected by the user, the drive mode DM may be automatically selected by the control apparatus 80 (vehicle side), for example, in accordance with the traveling state of the vehicle or the user's operation.

In the first embodiment, the ideal axial force Fib may be calculated by any other method, for example, based on a parameter other than the target steered angle θp* such as the target steering angle θh*, the steering torque Trqs, or the vehicle speed V. This also applies to the second embodiment.

In the first embodiment, the road surface axial force Fer may be estimated by any other method, for example, calculation based on a variation in yaw rate or vehicle speed. This also applies to the second embodiment.

In the first embodiment, the limiting reaction force setting processing unit M10b may be deleted from the reaction force setting processing unit M10. On the other hand, in the second embodiment, the limiting reaction force setting processing unit M10b may be added to the reaction force setting processing unit M44.

The target steering angle calculation processing unit M20 and the target steered angle calculation processing unit M48 may use a model formula based on a model additionally including a so-called spring item and using a spring constant K determined by specifications for a suspension and wheel alignment.

In the first embodiment, the maximum-value selection processing unit M36 uses the pair of parameters, that is, the steering angle θh and the steered angle θp, as comparison targets to be compared with the threshold. However, the invention is not limited to this. For example, for a four-wheel drive vehicle, three parameters including the steered angle for front wheels, the steered angle for rear wheels, and the steering angle may be used. In this case, the maximum-value selection processing unit M36 selects the maximum value θe from the three parameters. For the four-wheel drive vehicle, if the four steered wheels have different steered angles, five parameters including the four steered angles and one steering angle may be used.

In the first embodiment, the maximum-value selection processing unit M36 may exclusively use one parameter as a comparison target to be compared with a threshold. For example, the steered angle θp may be exclusively used as a parameter, provided that the spiral cable 68 is prevented from being fully stretched as the spiral cable 68 is provided with a margin in length and the steered angle θp is controlled to a steered angle threshold or smaller regardless of the steering angle ratio. The steering angle θh may be exclusively used as a parameter, provided that the spiral cable 68 has no margin and the rack shaft 46 is prevented from coming into contact with the rack housing 44 as the steering angle θh is controlled to a steering angle threshold or smaller regardless of the steering angle ratio.

In the first embodiment, the steering angle feedback processing unit M22 may calculate a manipulated variable (target reaction torque Trqr*) of the reaction force actuator 20 based on the sum of the output values from the proportional element and the differential element to which a value resulting from the subtraction of the steering angle θh from the target steering angle θh* is input, or only the output value from the proportional element. In each of the embodiments, the steered angle feedback processing units M32, M50 may calculate a manipulated variable (target steered torque Trqt*) of the steering operation actuator 40 based on the sum of the output values from the proportional element and the differential element to which a value resulting from the subtraction of the steered angle θp from the target steered angle θp* is input, or only the output value from the proportional element.

In the second embodiment, the addition processing unit M42 may be omitted, and the value used in the deviation calculation processing unit M46 and the addition processing unit M52 may be exclusively one of the assist torque Trqa* (vehicle speed V) and the steering torque Trqs.

In the second embodiment, the steering torque Trqs may be taken into account for calculation of the road surface axial force Fer. That is, the road surface axial force Fer may be obtained by adding the steering torque Trqs and the axial force applied to the rack shaft 46 by the steering operation motor 56 and calculated based on the q-axis current iq. In this case, the road surface axial force Fer can be more accurately calculated.

In each of the embodiments, the road surface axial force Fer is not limited to the road surface axial force calculated based on the q-axis current iq. The axial force applied to the steered wheels 30 may, for example, be directly detected using, for the rack shaft 46, a pressure sensor capable of detecting an axial force, or the like, and a detection result may be used as the road surface axial force Fer.

In each of the embodiments, each of the reaction force motor 26 and the steering operation motor 56 is not limited to an SPMSM but may be an IPMSM.

In each of the embodiments, the steering operation actuator 40 may be configured such that the steering operation motor 56 is arranged, for example, coaxially with or parallel to the rack shaft 46 so long as the steering operation actuator 40 is of a rack assist type. In the second embodiment, instead of the rack assist electric power steering system, a column assist electric power steering system may be implemented which applies an assist force to the column shaft 102 of the steering shaft 100. In this case, instead of the steering operation actuator 40, an assist force actuator including an assist force motor instead of the steering operation motor 56 may be mechanically coupled to the steering shaft 100 (specifically the column shaft 102). The rotation angle of a rotating shaft of the assist force motor is correlated with the steering angle of the steering shaft 100. Therefore, the rotation angle of the rotating shaft of the assist force motor is correlated with the steered angle of the steered wheels 30. Thus, the control apparatus 80 may use the integration processing unit M2 to calculate the steered angle θp by processing the rotation angle of the rotating shaft of the assist force motor detected by the corresponding sensor and multiplying the processed rotation angle by a conversion factor. The conversion factor in this case may be the product of a rotation speed ratio between a reduction gear in the assist force actuator and the rotating shaft of the assist force motor and a rotation speed ratio between the column shaft 102 and the pinion shaft 106.

In each of the embodiments, the control apparatus 80 may include dedicated hardware (ASIC) besides the CPU 82 and the memory 84. A portion of the processing performed by the CPU 82 may be executed by the hardware, from which the result of the processing may be acquired by the CPU 82.

What is claimed is:

1. A steering control apparatus that outputs an operation signal to a steering system, the steering control apparatus comprising:
   a control apparatus including a processor and a memory, the memory storing instructions that, when executed by the processor, cause the processor to function as a reaction force processing unit that outputs the operation signal to the steering system to control a reaction force acting against an operation of a steering wheel performed on the steering wheel, wherein the steering system includes:

a reaction force actuator that applies a reaction force and a steering operation actuator that applies a force for steering the steered wheels at least while power is not transmitted between steered wheels and the steering wheel, and the reaction force processing unit has:

a steering angle control processing unit that operates the reaction force actuator so as to adjust a detection value of a steering angle to a target steering angle that is a target value for the steering angle based on feedback control;

an ideal-component calculation unit that calculates an ideal component in which road surface information transmitted from a road surface to steered wheels is not incorporated;

a road surface component calculation unit that calculates a road surface component in which the road surface information is incorporated;

an allocated component calculation unit that calculates an allocated component in which the ideal component and the road surface component are allocated in a ratio, wherein the allocated component calculation unit varies the ratio in which the ideal component and the road surface component are allocated according to a state of a vehicle; and a target steering angle calculation processing unit that sets the target steering angle based on the allocated component.

2. The steering control apparatus according to claim 1, further comprising:

a steered angle control processing unit that operates the steering operation actuator so as to adjust a detection value of a rotation angle of a rotating shaft convertible into a steered angle of the steered wheels to a target steered angle that is a target value for the rotation angle based on feedback control; wherein the ideal-component calculation unit calculates, as the ideal component, an ideal transmission force that is an ideal value for a transmission force acting on the steered wheels based on at least one of the target steering angle and the target steered angle, and the road surface component calculation unit calculates the transmission force acting on the steered wheels as the road surface component based on an actual current value of the steering operation actuator.

3. The steering control apparatus according to claim 1, wherein the allocated component calculation unit is configured to enable allocation of a rate of the ideal component allocated in the allocated component when the ideal component is assumed to be 1 and a rate of the road surface component allocated in the allocated component when the road surface component is assumed to be 1 such that a sum of the rates is larger than 1.

4. A steering control apparatus that outputs an operation signal to a steering system, the steering control apparatus comprising:

a control apparatus including a processor and a memory, the memory storing instructions that, when executed by the processor, cause the processor to function as an assist force processing unit that outputs the operation signal to the steering system to assist an operation of a steering wheel to steer the steered wheels, wherein the steering system includes an assist force actuator that applies an assist force that assists the operation of the steering wheel, and the assist force processing unit has:

a steered angle control processing unit that operates the assist force actuator so as to adjust a detection value of a rotation angle of a rotating shaft that is convertible into a steered angle of the steered wheels to a target steered angle that is a target value for the rotation angle based on feedback control;

an ideal-component calculation unit that calculates an ideal component in which road surface information transmitted from a road surface to the steered wheels is not incorporated;

a road surface component calculation unit that calculates a road surface component in which the road surface information is incorporated;

an allocated component calculation unit that calculates an allocated component in which the ideal component and the road surface component are allocated in a ratio, wherein the allocated component calculation unit varies the ratio in which the ideal component and the road surface component are allocated according to a state of a vehicle; and a target steered angle calculation processing unit that sets the target steered angle based on the allocated component.

5. The steering control apparatus according to claim 4, wherein the ideal-component calculation unit calculates an ideal transmission force that is an ideal value for a transmission force acting on the steered wheels, as the ideal component, based on the target steered angle, and the road surface component calculation unit calculates the transmission force acting on the steered wheels as the road surface component based on an actual current value of the assist force actuator.

* * * * *